United States Patent Office 2,834,378
Patented May 13, 1958

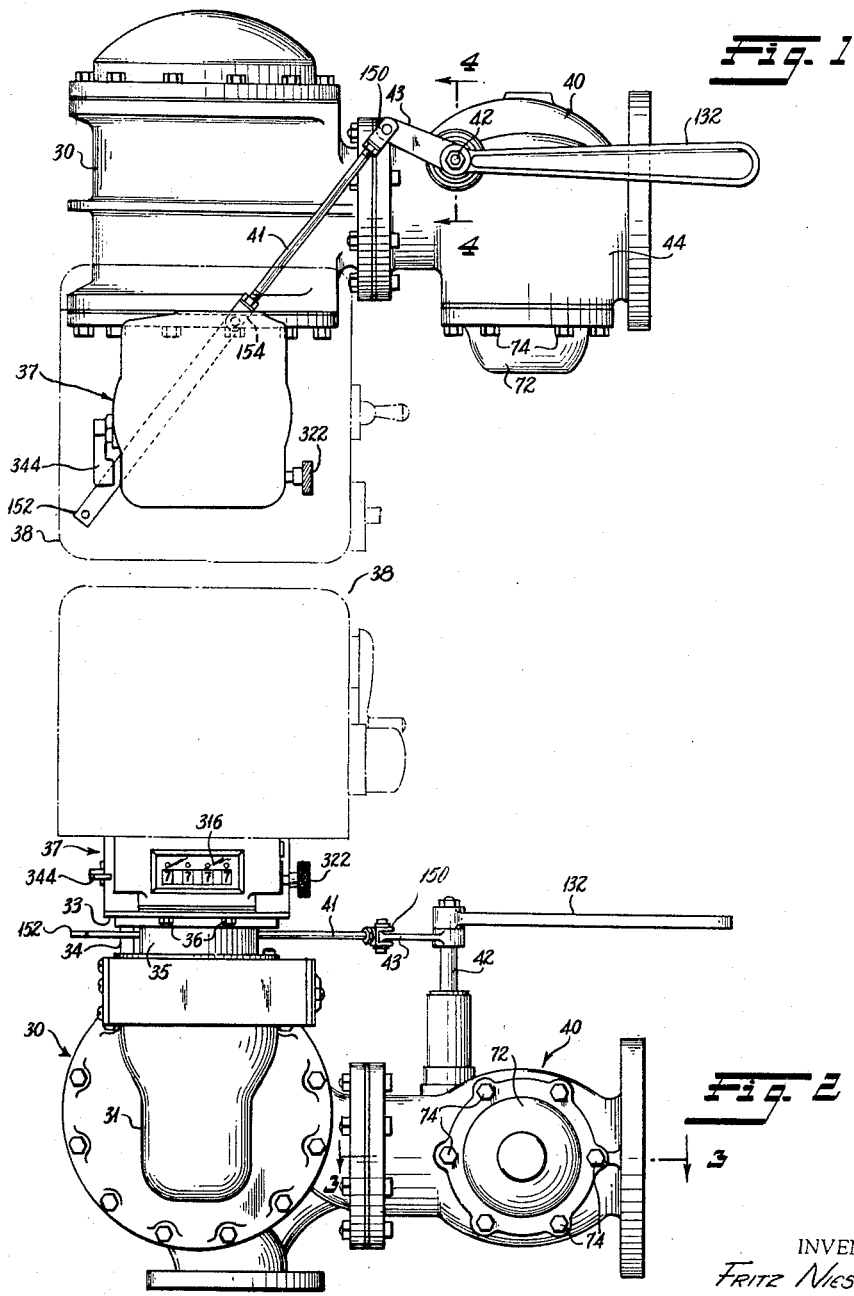

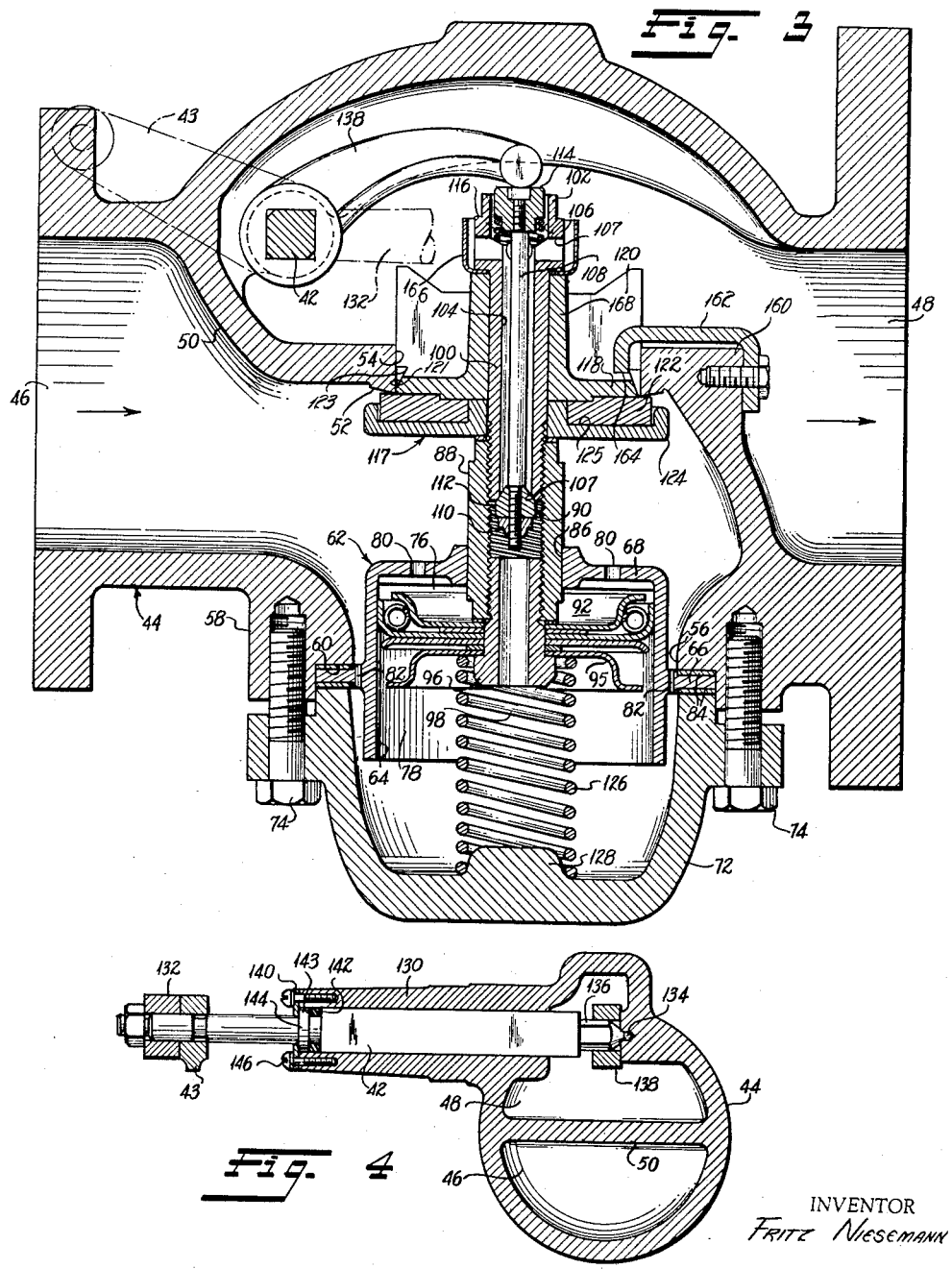

2,834,378

VALVE

Fritz Niesemann, Pittsburgh, Pa., assignor to Rockwell Manufacturing Company, Pittsburgh, Pa., a corporation of Pennsylvania Continuation of application Serial No. 410,975, February 17, 1954. This application June 3, 1957, Serial No. 663,097

4 Claims. (Cl. 137—630.15)

This invention relates to a valve for use with fluid dispensing apparatus and more particularly to improvements in such valve enabling proper use in predetermined quantity control of fluid in which quick easy opening and automatic cutting off of the fluid when the desired quantity has been delivered is desired and is a continuation of co-pending application Serial No. 410,975 filed February 17, 1954.

The invention in its preferred embodiment was developed in relation to the dispensing of large quantities of fluid at high velocity through a line having a flow control valve. Should the valve attempt to quickly and completely cut off the flow of fluid in one single stage of closing when the predetermined quantity has been dispensed, the hydraulic hammer caused by this quick cut-off would result in undue shock and damage to the valve, meter and other elements in the fluid line and may break the valve latching mechanism.

Furthermore in such high velocity large quantity fluid flow systems a single valve capable of such quick cut-off would have to be extremely powerful and speedy in action but delicately timed for accurate control, and such a valve and its control and actuating mechanism would be expensive and require constant attention to maintain its accuracy. Various types of single stage closure valve assemblies have been tried for the purpose but they have been mainly inefficient or so complicated or expensive as to prove unacceptable for practical purposes and have been discarded.

Consequently it has been proposed to provide apparatus wherein the delivery of fluid is cut off in gradual stages. For example it has been proposed that a meter in the fluid line operate a preset predetermined register mechanism which through some device such as a latch box will effect staged closing of the line. Usually this is done by closing a main valve when the greater part of the desired quantity of fluid has been delivered and continuing flow at a reduced rate through a smaller valve which is triggered at the proper time to complete the flow cut-off.

This prior two stage plural valve fluid cut-off apparatus has proved to some extent satisfactory in operation but it involves a multiplicity of small complex parts particularly in the latch mechanism for the valve and the valves used in association with such mechanism have been mechanically complex.

It has also been suggested to provide two stage closure of a single valve but such mechanisms have been complex and difficult to maintain in accurate adjustment.

The present invention provides a single quantity control valve which can be readily moved to and latched in an open position and as disclosed in the aforementioned parent application, is adapted for use in plural stage closure with a relatively simple uncomplicated structure. The novel valve structure incorporates a fluid pressure balancing means together with a pressure equalizing pilot valve opened prior to moving the valve to open position to facilitate opening of the valve.

With these and other considerations in view, a primary object of this invention is to provide a novel fluid flow control valve of greatly simplified construction, the operation of which, from open to closed position, is adapted to be controllable by a meter driven register and latching device in three or more stages.

Another object of the invention is to provide a novel pilot-operated, hydraulically balanced fluid flow control valve, the construction of which is greatly simplified over the prior art valves.

With the above and other objects in view, the invention comprises the improved predetermining dispensing mechanism for fluid meters and the construction and relative arrangements of its several component parts, as will hereinafter be more fully described, illustrated in the accompanying drawings, and subsequently incorporated in the appended claims.

Figure 1 is a plan view of the general assembly of a meter, register, valve and control linkage, illustrating the valve of this invention in plan view;

Figure 2 is a front elevation of the assembly shown in Figure 1, also illustrating the valve in front elevation;

Figure 3 is a horizontal section of the pilot operated valve taken along the lines 3—3 of Figure 2; and Figure 4 is a section taken along the lines 4—4 in Figure 1 showing the valve operating arm and shaft.

GENERAL ASSEMBLY

For purposes of illustration, in Figures 1 and 2 of the drawings there is disclosed a general assembly of the several component units of a predetermining dispensing system utilizing the valve of my present invention. The fluid pressure operated meter 30 is preferably of the well known "Rotocycle" type, an example of which is disclosed in United States Patent No. 2,274,206 issued February 24, 1942. The meter is provided with a cast vertical end housing section 31 which encloses a vertically extending continuously driven meter operated drive shaft (not shown) which is connected to the register input. Clamped between the upper end of the housing 31 and a base plate 33, as by machine screws passing through spacers 34, is a latch box unit indicated generally by the numeral 35. Rigidly mounted on the base plate 33, as by screws 36, is a housing unit 37 which contains the settable predetermining register mechanism. The totalizing register 38 is secured to the top of housing 37 by suitable means (not shown).

The quantity control valve unit 40 is rigidly attached to the outlet of the fluid meter 30 and is operatively connected to the valve latching unit 35 by a rod 41, arm 43, and shaft 42.

Valve

The details of the valve construction are shown in Figures 3 and 4 and comprise a main body casting 44 which has aligned fluid inlet and outlet passages therein, respectively numbered 46 and 48. Passages 46 and 48 are separated from each other by a transverse web 50 which is integrally formed with the body 44. A circular opening 54 formed in web 50 permits fluid communication between the passages 46 and 48 and has a tapered valve seat 52 formed on the lower portion of its periphery.

Coaxial with opening 54 is an opening 56 in the valve body 44, around which extends a circular flange 58. An annular shoulder 60 is milled into flange 58 to provide an annular abutment coaxial with openings 54 and 56. Received within opening 56 is a rigid plunger housing 62 consisting of cylindrical side wall 64 having integrally formed on the exterior thereof a laterally extending annular flange 66 adapted to seat on the annular shoulder 60 in flange 58. The plunger housing 62 is completed by an integral top wall 68 and reciprocally receives a plunger or piston 70 having a concentric bore therein. An access cap 72 is secured to the valve body 44 by bolts 74 so as to clamp the annular flange 66 between the shoulder 60 and the access cap 72 to thus hold the plunger housing 62 rigidly in position within the valve body 44.

The interior of plunger housing 62 is divided into chambers 76 and 78 by means of plunger 70. Chamber 76 is connected to inlet passage 46 by a plurality of passages 80 drilled through top wall 68 of housing 62 and sufficient in number to permit relatively unrestricted fluid flow into and out of chamber 76. Chamber 78 is connected with inlet passage 46 by predetermined orifice bleed passages 82 drilled through the annular flange 66 closely adjacent the side wall for a purpose explained below. Gaskets 84 on both sides of flange 66 prevent escape of fluid between valve body 44 and access cap 72.

Extending through a central bore 86 in the top wall of housing 62 is a valve sleeve 88, also termed the lower portion of the valve stem, which has an axially extending threaded bore 90. The valve sleeve 88, a concentrically bored spring clip seal assembly 92, plunger 70, a washer 94 and a lower cupped plate 95 are assembled and clamped in respective abutting relation by a hollow screw 96 passing through the washer, plunger and seal assembly and threaded into bore 90. The internal axially extending bore 98 of screw 96 connects valve sleeve bore 90 with chamber 78.

The main valve stem 100 has a head portion 102 and is externally threaded on its lower end. Stem 100 has axially extending internal bore 104 connecting at one end with a counterbore 106 in the head portion 102, and terminating at its opposite end in an annular valve seat 107 formed on the lower end of the valve stem. A pilot valve stem 108 extends through bore 104 has a threaded undercut portion at its lower end holding a pilot valve element 112 clamped against the stem body by a nut 110 threaded on the end of the stem. A pilot valve head 114 is threaded to the upper end of pilot valve stem 108 within counterbore 106 of valve stem 100 and a spring 116 is compressed between head 114 and the shoulder formed between counterbore 106 and bore 104. Spring 116 biases the pilot valve member 112 against the seat 107 formed on the lower end of main valve stem 100, thereby closing off the passage 104 from bore 90. It will be noted that ample clearance exists between the pilot valve stem 108 and the bore 104 and between the pilot valve head 114 and the wall of counterbore 106 to permit flow of fluid through passage 98, bores 90 and 104, counterbore 106 and cross passage outlets 107 when the valve member 112 is unseated.

The main valve member 117 consists of a guide member 118, a resilient valve member 122 and a back-up plate 124, all of generally circular configuration in plan and all mounted on main valve stem 100 by means of suitable central coaxial bores extending respectively therethrough. Back-up plate 124 has an annular recess 125 in which valve member 122 is disposed. The main valve stem 100 is threaded into bore 90 in valve sleeve 88 to clamp the guide member 118, valve member 122 and plate 124 between the sleeve head portion 102 and the upper end of valve sleeve 88 in such a manner that the guide member 118 extends through opening 54 in web 50. When the valve is in its closed position, as shown in Figure 3, resilient valve member 122 is seated on seat 52 to close off the outlet passage 48 from inlet passage 46. Integrally formed on guide member 118 are four radially extending vanes 120 which serve to pilot or guide the main valve assembly in the opening 52 during opening and closing movements. The periphery 121 of the base of guide member 118 is slightly tapered and is coextensive with inclined notches 123 in the vanes 120 thus providing a clearance between guide 118 and valve seat opening 54 which increases as the valve member 117 moves toward open position to obtain a maximum flow opening as rapidly as possible. A spring 126 is compressed between the plunger 70 and the access cap 72 and is piloted thereon by a boss 128. Spring 126 bears against the plunger 70 and serves to normally urge the main valve assembly towards a closed position.

Fastened to a boss 160, integral with the web 50 on the side of outlet passage 48 is a valve guide stop 162, a heavy U-bracket which extends over the valve seat opening 54 between vanes 120 of valve guide member 118. An overhanging end 164 of valve guide stop 162 is disposed above the base of guide member 118 and will limit vertical movement of the main valve member when the guide member 118 abuts end 164. This prevents the resilient member 122 from becoming damaged by successive impacts and compressions against valve seat 52.

An apertured cup-shaped flow directing sleeve 166 is clamped between the shoulder of valve stem head 102 and the sleeve 168 of valve guide member 118. The outer wall of flow directing sleeve 166 surrounds and is spaced a short distance from the pilot valve outlet passages 107 to divert high velocity jets of fluid which issue from outlets 107 when the pilot valve is opened.

Referring particularly to Figures 1, 2 and 4, a vertically extending sleeve 130 is integrally formed on valve body 44. Journalled for rotary motion therein is a shaft 42, the lower end of which is piloted in the valve body 44 as shown at 134. The shaft 42 has a squared end portion 136. Fixed on the square portion for rotary movement therewith is a lever 138 (Figures 3 and 4), the free end of which bears against pilot valve head 114. The shaft 42 is held against axial movement relative to sleeve 130 by means of the integral shoulder 144, formed thereon, abutting an annular collar 140 secured to the upper end of sleeve 130 by screws 146. An O ring seal 142 is provided in a groove 143 adjacent the shoulder 144 and prevents escape of fluid from the outlet passage 48 between shaft 42 and sleeve 130. Referring to Figure 4, as shaft 42 is rotated in a clockwise direction, the initial movement of lever 138 will depress pilot valve stem 108 against the combined pressures of spring 116 and the fluid acting against pilot valve 112, to unseat valve 112. Continued rotation of said 42 will cause lever 138 to completely compress spring 116 and unseat the main valve assembly 117 against the pressure of spring 126.

When the valve assembly is in closed position, a pressure differential will exist between the inlet passage 46 and the outlet passage 48 which tends to maintain the main valve in its closed position. As previously pointed out, passages 80 and bleed orifices 82 respectively connect the chambers 76 and 78 to inlet passage 46, and will eliminate static pressure differential across plunger 70. Therefore, when the main valve 117 is in its closed position, the chamber 78 and all passages communicating therewith will be under the same pressure as that existing in inlet passage 46 i. e., line pressure. As explained, the lever 138, in its initial opening movement, will unseat pilot valve 112 against the pressure existing in chamber 78. However, since the pilot valve 112 is of a relatively small area, the total force acting against it by reason of the fluid pressure in chamber 78 is relatively small. As soon as the pilot valve member 112 is unseated, the outlet passage 48 is connected with the chamber 78 through passages 98, 90, 104 and counterbore 106, thereby quickly reducing the pressure in chamber 78 to the pressure of the outlet passage 48. Because of the restricted orifice bleeds 82, a considerable time interval will occur before the pressure in chamber 78 can increase to equal that in inlet passage 46. During this interval, there will be fluid pressure from the inlet chamber exerted through unrestricted passages 80 against the top of piston 70 tending to open the main valve. The fluid under pressure in the inlet chamber 46 also acts against the bottom of the valve plate 124, tending to maintain the main valve in a closed position. Since the area of piston 70 is slightly greater than the area of plate 124, and equal pressures are acting against both, a resultant force tending to open the main valve is available during this interval to counterbalance the effect of spring 126, thereby enabling a practically effortless initial opening of the valve.

An operating handle 132 and lever arm 43 are removably mounted on the splined outer end of shaft 42. One end of latch rod 41 is pivotally connected to the free end of lever arm 43 as by a clevis and pin arrangement 150. The opposite end of rod 41 is pivoted to a latch bar 152 as by another clevis and pin arrangement indicated at 154 on Figure 1. The shaft 42 is thus connected with the mechanism of latch box 35 by means of lever arm 43, rod 41 and latch bar 152, and reciprocation of latch bar 152 will directly control opening and closing of the valve assembly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flow control valve for use in a predetermining dispensing apparatus comprising: a valve body having an inlet passage and an outlet passage therein disposed adjacent one another; valve means between said passages biased to a closed position by fluid pressure in the inlet passage and comprising a hollow valve stem, pilot valve means within said hollow stem biased to closed position by said fluid pressure in the inlet passage, spring means in said hollow valve stem biasing said pilot valve to a closed position; a chamber, having one apertured end wall disposed concentrically to said valve stem in said inlet passage; piston means on said valve stem within and dividing said chamber into upper and lower portions; predetermined orifice bleed means connecting the lower cylindrical chamber portion to said inlet valve passage; fluid passage means formed in said apertured end wall and connecting said upper chamber portion with said inlet passage; and means to successively actuate said pilot valve and said main valve againt the biasing forces.

2. A flow control valve comprising: a valve body having a partition therein forming an inlet passage and an outlet passage; an opening in said partition having a valve seat on the inlet side, a cylindrical chamber having a closed end and one open end fixed in said inlet passage coaxial with said opening, said closed end facing said opening, having an aperture formed therein coaxial with said opening and having passages connecting said closed end of said chamber to the valve inlet passage; orifice bleed means connecting said open end to the inlet passage; a hollow valve stem concentric to and extending through said opening and slidably fitting in said aperture; a piston slidable in said chamber and fastened to one end of said valve stem; a valve member disposed externally on said valve stem intermediate the ends thereof; spring means acting between said one end of said valve stem and said valve body to bias said valve member toward abutting relation with said valve seat; a pilot valve in said hollow valve stem having an actuating rod extending coaxial internally and projecting from the other end of said valve stem and having a head portion on the rod projection; and spring means coacting between said head position and the valve stem to bias said pilot valve to a closed position; rotatably mounted shaft means extending from the interior to the exterior of said body having a lever means on the interior and coacting with said pilot valve head portion to control said pilot valve and main valve.

3. A flow control valve comprising: a valve body having a partition therein forming an inlet passage and an outlet passage; an opening in said partition having a valve seat on the inlet side, a hollow valve stem extending through said opening, a main valve element and guide means on said valve stem in the inlet side of said valve body adapted to guide in said opening and seat on said valve seat; spring means biasing said valve stem and main valve to a closed position; guiding and fluid pressure balancing means coacting with said spring biased valve stem to guide said valve stem during valve opening and closing movements and to fluid pressure balance said valve during opening movement; a pilot valve means located within said valve stem including a second valve seat, a valve closure member on the inlet side of said second valve seat and a stemmed operator on said closure member and extending through said second seat, said valve closure member being biased to a closed position by inlet fluid pressure and having a compression spring between said second valve seat and said stemmed actuator biasing said pilot valve means to a closed position; and control means adapted to abut said pilot valve means to successively control said pilot valve and said main valve.

4. A flow control valve assembly comprising: a valve body having a partition therein forming an inlet passage and an outlet passage, there being an opening in said partition providing a valve seat on the inlet passage side; a cylindrical member having one closed end and one open end fixed in said inlet passage coaxial with said opening, said closed end facing said opening and having an aperture formed therein coaxial with said opening; bleed means connecting both ends of said cylindrical member to the valve inlet passage; a hollow valve stem concentric to and extending through said opening and slidably positioned in said aperture; a piston member slidably disposed in said cylindrical member and fastened around one end of said valve stem; a valve member disposed externally of said chamber on said valve stem intermediate the ends thereof; spring means acting between said one end of said valve stem and said valve body to bias said valve member toward abutment with said valve seat; a pilot valve in said hollow valve stem having an actuating rod extending coaxial internally of and projecting from the other end of said valve stem and having a head portion on said projecting end, spring means coacting between said head portion and the valve stem to bias said pilot valve to a closed position; lever means on the interior of said valve body coacting with said pilot valve head portion for controlling valve position; and means connected to said lever means for actuating said valve assembly including a manual means to position said valve assembly in open position against spring bias.

No references cited.